United States Patent [19]

Benton

[11] Patent Number: 4,834,476

[45] Date of Patent: May 30, 1989

[54] REAL IMAGE HOLOGRAPHIC STEREOGRAMS

[75] Inventor: Stephen A. Benton, Lincoln, Mass.

[73] Assignee: Massachusetts Institute of Technology, Cambridge, Mass.

[21] Appl. No.: 142,917

[22] Filed: Jan. 12, 1988

Related U.S. Application Data

[63] Continuation-in-part of Ser. No. 33,096, Mar. 31, 1987, abandoned.

[51] Int. Cl.[4] ............................................. G03H 1/30
[52] U.S. Cl. .................................. 350/3.76; 350/3.65; 350/3.86
[58] Field of Search ................ 350/3.65, 3.74, 3.76, 350/3.86, 3.81

[56] References Cited

U.S. PATENT DOCUMENTS

| | | | |
|---|---|---|---|
| 3,946,370 | 3/1976 | Schmidt et al. | 340/173 |
| 4,130,337 | 12/1978 | Okoshi | 350/3.86 |
| 4,206,965 | 6/1980 | McGrew | 350/3.76 |
| 4,339,168 | 7/1982 | Haines | 350/3.69 |
| 4,364,627 | 12/1982 | Haines | 350/3.76 |
| 4,411,489 | 10/1983 | McGrew | 350/3.76 |
| 4,421,380 | 12/1983 | McGrew | 350/3.76 |
| 4,429,946 | 2/1984 | Haines | 350/3.76 |
| 4,445,749 | 5/1984 | Benton | 350/3.76 |
| 4,498,740 | 2/1985 | Caulfield | 350/3.66 |

OTHER PUBLICATIONS

Benton, *SPIE Proc.*, Survey of Holographic Stereograms, vol. 367 (1983), pp. 15-19.
Benton, *SPIE Proc.*, Display Holography, vol. 532 (1985), pp. 8-13.
Benton, *SPIE Proc.*, Photographic Holography, vol. 391 (1983), pp. 2-9.
Huff and Loomis, *SPIE Proc.*, Three-Dimensional Imaging with Holographic Stereograms, vol. 402 (1983), pp. 402-407.
Benton, *J. Opt. Soc. Am.*, Distortions in Cylindrical Holographic Stereogram Images, vol. 88 (1978), p. 1440.
Jaffey and Dutta, *SPIE Proc.*, Digital Perspective Correction for Cylindrical Holographic Stereograms, vol. 367 (1982), pp. 130-140.
Huff and Fusek, *J. Opt. Soc. Am.*, Distortion Correction in Cylindrical Holographic Stereograms, vol. 51 (1981), p. 1568.
Glaser, *Optics Communications*, Anamorphic Imagery in Holographic Stereograms, vol. 7 (1973), pp. 323-326.
Kasahara et al., *Applications of Holography*, "3-D Construction of Imaginary Objects by the Method of Holographic Stereograms" (1971), pp. 19-34.

*Primary Examiner*—Rodney B. Bovernick
*Assistant Examiner*—Terry S. Callaghan
*Attorney, Agent, or Firm*—Thomas J. Engellenner

[57] ABSTRACT

Methods and devices for recording and projecting holographic stereograms are disclosed. In one aspect of the invention, a concave semi-cylindrical ("alcove") display system is disclosed in which an image is projected in front of the alcove. The display system provides a very wide angle of view approaching 180 degrees (compared to the 30 degrees of a typical flat hologram) that allows the viewer to look around most of the image content. This type of display is particularly useful in computer aided design projects where designers wish to present an overall three-dimensional display of their work. In another aspect of the invention, a holographic printer and procedures for recording a stereogram are disclosed as well as techniques for producing "predistorted" images for the sub-holograms. A digital processing technique is disclosed which effectively predistorts the source two-dimensional image set for the stereogram to compensate for the effects of the display geometry. This predistortion technique relies upon anamorphic ray tracing. A crossed slit model for the holographic optical system is used to determine the direction and origin of the rays of light from which each sub-hologram of the stereogram is made.

17 Claims, 7 Drawing Sheets

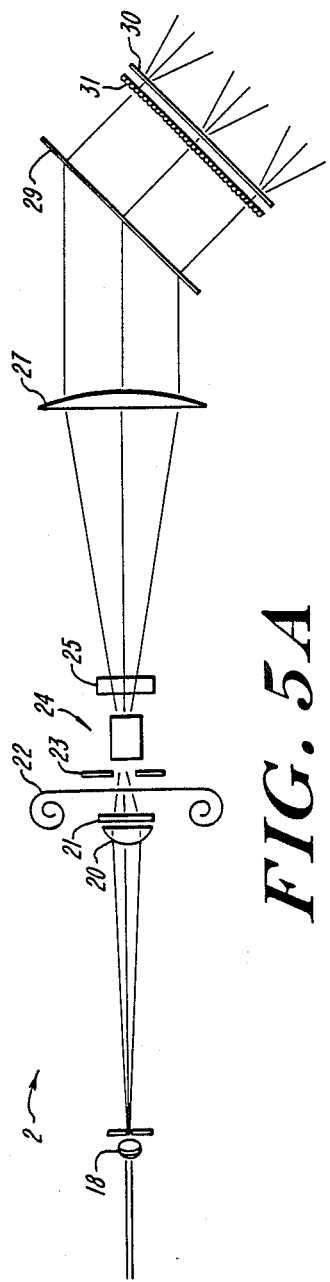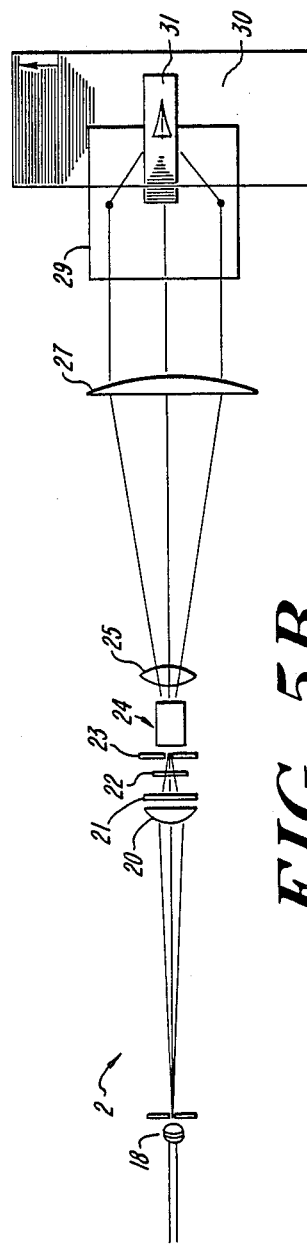

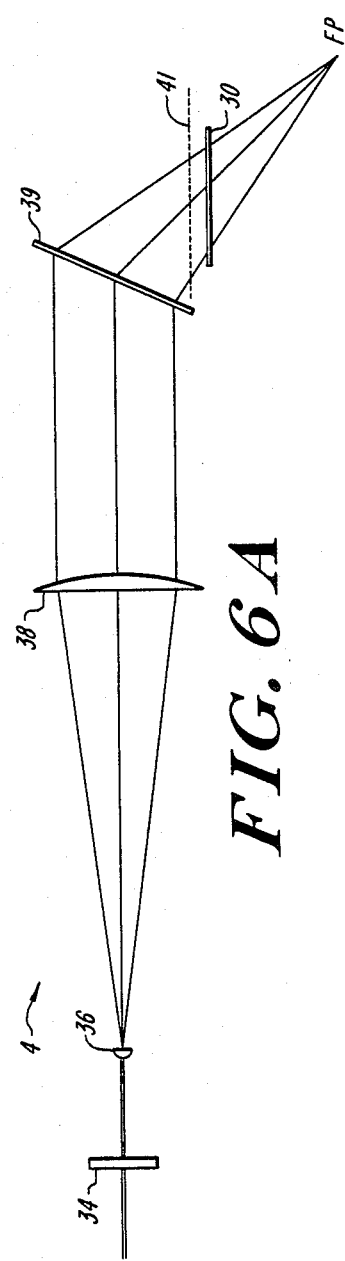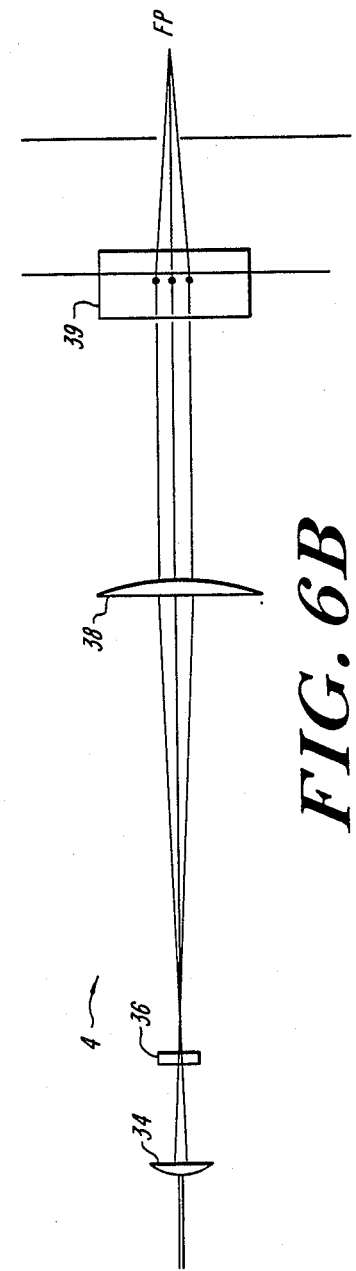

REAL IMAGE HOLOGRAPHIC STEREOGRAMS

REFERENCE TO RELATED APPLICATION

This application is a continuation-in-part of U.S. Ser. No. 033,096 filed Mar. 31, 1987 now abandoned.

BACKGROUND OF THE INVENTION

The technical field of this invention is holography and, in particular, methods and devices for recording and projecting holographic stereograms for computer-aided design displays and other applications.

The growing speed and memory capacities of modern computers have made possible the computation and analysis of fully three-dimensional problems that could only be contemplated a few years ago. But the input and output of three-dimensional data continue to be substantial bottlenecks in the efficient use of such systems. For example, the design and evaluation of complex structures, such as homes, offices and automobiles, is increasingly being undertaken by computer, wherein the same data base can serve for both engineering and styling evaluation. Such structures can become understood from their two-dimensional renderings onto CRT screen surfaces by their designers, who spend hours studying the subject from many different viewpoints, but the rapid and accurate communication of a complex, three-dimensional shape to another human's mind requires its presentation in fully three-dimensional form.

Traditionally, presentations of three-dimensional designs have taken the form of physical models at various scales formed from wood, cardboard, or clay, which combine a visual and tactile verisimilitude that has an enduring appeal. However, much more rapidly rendered, visually solid representations are available directly from the computer's data base via various optical and electronic output modalities. Described herein is a new type of computer-graphic hologram called the "alcove" hologram that offers an important step toward a visual experience that rivals physical models in their realistic sense of solidity and shape.

The technologies for generating holograms with computers typically fall within one of three types. In the first case, the hologram's dark-and-light fringe patterns are computed by mathematically stimulating the light propagation and interference processes, and then recording those fringes as photographic output. See generally, W. H. Lee, "Computational Holography," in E. Wolf, ed., *Progress in Optics,* Vol. XVI (North Holland Publ. Co., 1978) pp. 121-122, herein incorporated by reference. The fringes of a typical hologram are very closely spaced, perhaps 1500 cycles per millimeter (40,000 line pairs per inch), so that an enormous amount of calculation is required, and the recording of the output fringes is currently possible only with electron-beam lithography equipment ordinarily used to manufacture integrated circuitry. Such methods are beyond the practical reach of current technology.

The second approach is to record a patch of an off-axis Fresnel zone plate (a "diffraction lens," produced by interference) on a photographic plate for every resolvable point of the image. See generally, H. J. Caulfield, "Hologram Write and Method," U.S. Pat. No. 4,498,740 (issued Feb. 12, 1985), herein incorporated by reference. Several hours are required to write tens of thousands of patches, and the diffraction efficiency of the hologram decreases as the reciprocal of the number of patches overlapping at any point, so that the number of usable points is less than 10,000 in practice.

Thirdly, for visual applications, the resolution potential of true or fully computed holograms often is not required, as nothing beyond the resolution of the unaided eye will be needed. In any case, if the image is to be computer generated, its resolution is limited by the pixelation of the calculation. See generally, S. A. Benton, "Photographic Holography," in SPIE Proc. Vol. 391—"Optics in Entertainment" (1983), pp. 2-9, herein incorporated by reference. A series of perspective views, corresponding to the expected viewpoints of the audience, can be computed by conventional computer-graphic techniques. Each perspective view can then be projected with laser light onto a piece of high resolution film from the angle corresponding to its computed viewpoint, overlapped by a coherent "reference" beam to produce a holographic exposure that records the direction of the image light. After all the views have been recorded in this way, the hologram is processed and then illuminated so that each view is sent back out in the direction it was projected from, that is, toward its intended viewing location, so that a viewer moving from side to side sees a progression of views as though he or she were moving around an actual object.

If the images are accurately computed and registered, the resulting image looks like a solid 3-D object. Such a composite or synthetic hologram is termed a "holographic stereogram." It mimics the visual properties of a true hologram even though it lacks the information content and interferometric accuracy of a true hologram.

Holographic stereograms have proven capable of rendering very satisfying and solid looking computer graphic images. However, the best of them have required two optical steps and a correspondingly long time to produce and offer only a limited image projection and angle of view. There exists a need for better holographic methods and devices that can provide images that project strikingly, to within the viewer's grasp, and that offer a very wide angle of view. Further, if such images can be produced in a single optical step by a technique that can be extended to the rapid and automatic production of very large-size holograms, a long-felt need in the industry would be satisfied. The present invention addresses such needs and is specifically designed to be adaptable to a computer-graphic, 3-D hard copy peripheral device for computer-aided design systems.

SUMMARY OF THE INVENTION

Methods and devices for recording and projecting holographic stereograms are disclosed. In one aspect of the invention, a concave semi-cylindrical ("alcove") display system is disclosed in which a real image is projected in front of the alcove. The display system provides a very wide angle of view approaching 180 degree (compared to the 30 degrees of a typical flat hologram) that allows the viewer to look around most of the image content. This type of display is particularly useful in computer aided design projects where designers wish to present an overall, three-dimensional display of their work.

Upon viewing the "alcove" hologram from any single point of view, the image is seen to be composed of a series of vertical strips, each presenting a view of a fragment of the image screen that exposed it (in practice, the strips are abutted so well that they are not individually visible). In order that the composite image present to any one viewpoint be the perspective view of the subject from that viewpoint, the perspective view must be dissected into vertical strips and each presented on the corresponding image screen in the correct location.

In another aspect of the invention, holographic printers and procedures for recording a stereogram are disclosed. Printers for both reflection-mode and transmission-mode holograms are disclosed. In the printers, after being expanded and shaped to fit the image focusing optics, the image beam is modulated in intensity by the computed perspective view appropriate for the strip to be exposed. For the "alcove" hologram, the images roughly correspond to views of the subject as rotated on a turntable, but with substantial image processing to avoid distortion of the scene, especially where it extends toward and behind the hologram surface.

These images, after computation, can be recorded on 35 mm "cine" film and presented in a pin-registered film transport, or directly presented via a video-driven spatial light modulator. The image is then magnified and focused on the "image screen," which further shapes the beam for the holographic exposure. The object beam and a reference beam are then used to expose narrow strips of holographic film. The reference beam optics are preferably chosen such that the reference beam overlaps the object beam at the holographic film surface and then converges at a distance equal to the intended illumination distance.

In the transmission mode display, the hologram is viewed by illumination with a converging laser beam which is reflected by half cylindrical mirror disposed behind the hologram. The laser light is reflected by the mirror and then transmitted through the hologram to create a real image in the "alcove." In the reflection mode display, the hologram is viewed by illumination with a source of white light situated above the alcove. The white light is reflected by the hologram, itself, to again create a three-dimensional real image within the alcove. As detailed below, the transmission mode printer projects both the reference and object beams onto the same side of the holographic medium. In the reflection mode printer, the reference and object beams are incident from opposite sides of the recording medium.

In both the transmission and reflection formats, the hologram is reconstructed with phase conjugate illumination, the "time reverse" of the reference beam, to yield a real image of the object centered in the alcove space. Unlike previous cylindrical stereograms (i.e., convex or "lampshade" displays) which produce virtual images behind the hologram surface, the printers disclosed herein produce holograms which display real images upon illumination with a time-reversed reference beam. An observer can thus "grasp" at the projected image without obstruction from the hologram cylinder. The overall result is a more vivid and realistic image.

Techniques for producing "predistorted" images for the sub-holograms are also disclosed. In one approach, all the side-to-side views can be computed (there may be 1000 or so). Each is then sliced into vertical strips, and images intended for printing are assembled from different strips from each image. In addition, each strip may be vertically demagnified, depending on its eventual distance from the viewer. When the image is intended for reflection-mode display, an additional preprocessing correction can be made to account for the illumination angle of the printer optics.

Since the input images are conventional perspective views they can be previewed easily to check image composition and may be photographically recorded, or rendered with very rapid computer-graphic algorithms (developed for the film animation industry). In addition, they can be combined by digital matte processes and so forth.

Alternatively, equivalent images can be produced in a single step by recording predistorted views. A digital image processing technique is disclosed which effectively predistorts the source two-dimensional image set for the stereogram to compensate for the effects of the display geometry. Essentially, this predistortion technique relies upon anamorphic ray tracing. A crossed slit model for the holographic optical system is used to determine the direction and origin of the rays of light from which each sub-hologram of the stereogram is made.

If the image projected on the holographic film is suitably anamorphic, then upon display, it will produce undistorted composite hologram images. A computer graphic ray-tracing system is disclosed to mimic a pinhole optical imaging arrangement. The ray-tracing system is based on a crossed slit model in which a vertical slit is simulated at the intended location of the hologram image and a horizontal slit is simulated at the intended location of the viewer. When the component images are computed by anamorphic ray-tracing, each can be used to print a strip hologram as soon as it is ready, without delay, and without the need for intermediate storage. Thus, the computation and hologram printing can proceed together in locked-step, probably the most efficient overall hologram generating strategy.

The invention will next be described in connection with certain illustrated embodiments. However, it should be clear that those skilled in the art can make various modifications, additions and subtractions without departing from the spirit or scope of the invention. Color displays, instead of monochromatic displays, can be achieved by various techniques known in the art. Color displays can be produced by color-dependent emulsion swelling techniques when the reflection format is used or by the incorporation of color strip arrays in the transmission format. Color shifting techniques can also be employed so that the object image can be viewed in a different color than the exposing light. Moreover, the invention is illustrated below by a system in which the stereograms consist of area-multiplex sub-holograms which are recorded as thin vertical strips. A more complex system can take vertical parallax into account by exposing the holographic medium to views which differ in vertical perspective.

BRIEF DESCRIPTION OF THE DRAWINGS

FIGS. 5A and 5B are side and top views, respectfully, of the object beam optics of a refection-mode hologram printer.

FIGS. 6A and 6B are side and top view, respectively, of the reference beam optics of a reflection-mode hologram printer.

DETAILED DESCRIPTION

Figure 1:
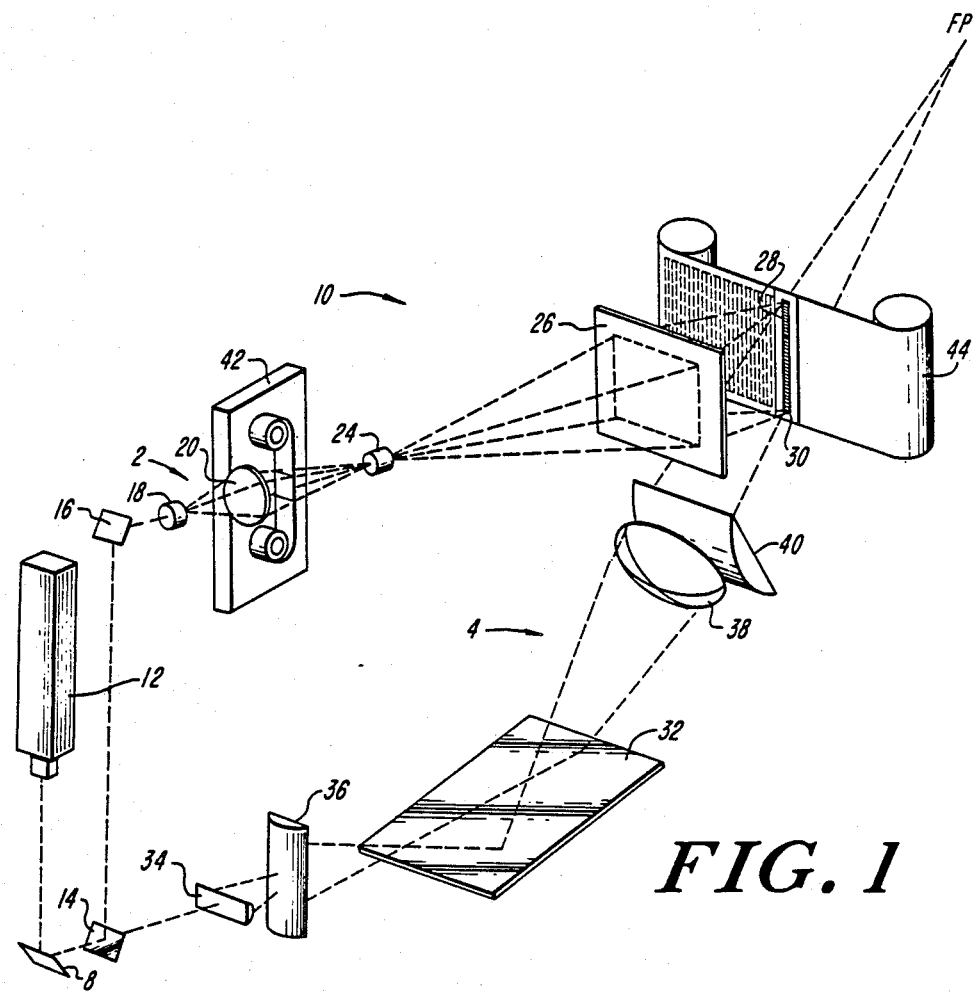
FIG. 1 is a schematic isometric illustration of an alcove hologram printer for transmission-mode holograms according to the invention.

In FIG. 1, an alcove printer 10 adapted for transmission-mode displays is disclosed, including a laser 12 (e.g., a krypton ion laser operating at about 647 nanometers), first mirror 8, a beam splitter 14 object optics 2 and reference optics 4. The object optics 2 further includes mirror 16, a divergent lens 18, and condensing lens 20, projection medium 22, projection lens 24 and image screen 26 (e.g., a ground glass plate). The reference optics 4 further includes mirror 32, first cylindrical lens 34, second cylindrical lens 36, collimating lens 38 and condensing cylindrical lens 40. The alcove printer also includes aperture-defining window 28 and holographic film 30.

Light from laser 12 is divided by beam splitter 14 to form the object and reference beams. The object beam is diverged and then converged by lenses 18 and 20 to illuminate the perspective views on projection medium 22. The medium 22 can, for example, be 35 mm "cine38 film or any other light modulating medium, such as an electrooptic image modulator. The perspective views can be actual photographic recordings or, particularly for computer-aid design applications, can be computer generated designs. In either event, the perspective views are pre-distorted as described below. The image screen 26 and optical window 28 cooperate to diffuse and focus the sub-hologram images onto the holographic recording film 30 as a narrow vertical strips. In diffusing the light from the object, image screen 26 serves to spread the image in the vertical direction and thereby expand the vertical viewing zone of the resulting alcove hologram display.

At the same time, the reference beam is anamorphically diverged by cylindrical lenses 34 and 36 and then converged by collimating lens 38 and cylindrical condensing lens 40 to overlap the object beam exposure on the holographic recording medium 30. In order to uniformly expose a narrow strip of film, the reference beam should be elliptically shaped, with a large central area of uniform flux. Adequate uniformity can be obtained by over-filling the strip. The general shape of the beam is matched to the strip by using crossed strong and weak cylindrical lenses 34 and 36, in place of the usual microscope objective, to diverge the beam. The lenses are placed so that the larger diameter lenses collimate the beam in the horizontal direction, and converge it vertically to a focus at a distance FP equivalent to the intended illumination distance.

Figure 2:
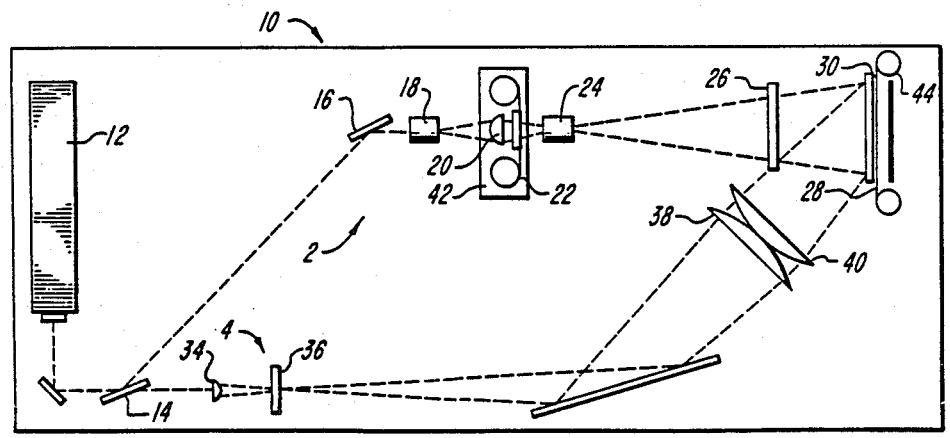
FIG. 2 is more detailed schematic layout in side view of a printer for transmission-mode holograms according to the invention.

FIG. 2 shows a more detailed side view layout of an alcove printer 10 for transmission-mode displays with the same components being referenced as like-numbered elements. FIG. 2 is an overhead view of the printer as laid out on a vibration isolation table. The film 22 containing the perspective views is advanced by a motorized pin-registered transport 42, and the holographic film 30 (held flat) is moved vertically by a sliding transport 44 which incorporates the aperture-defining window 28.

Figures 3, 4:
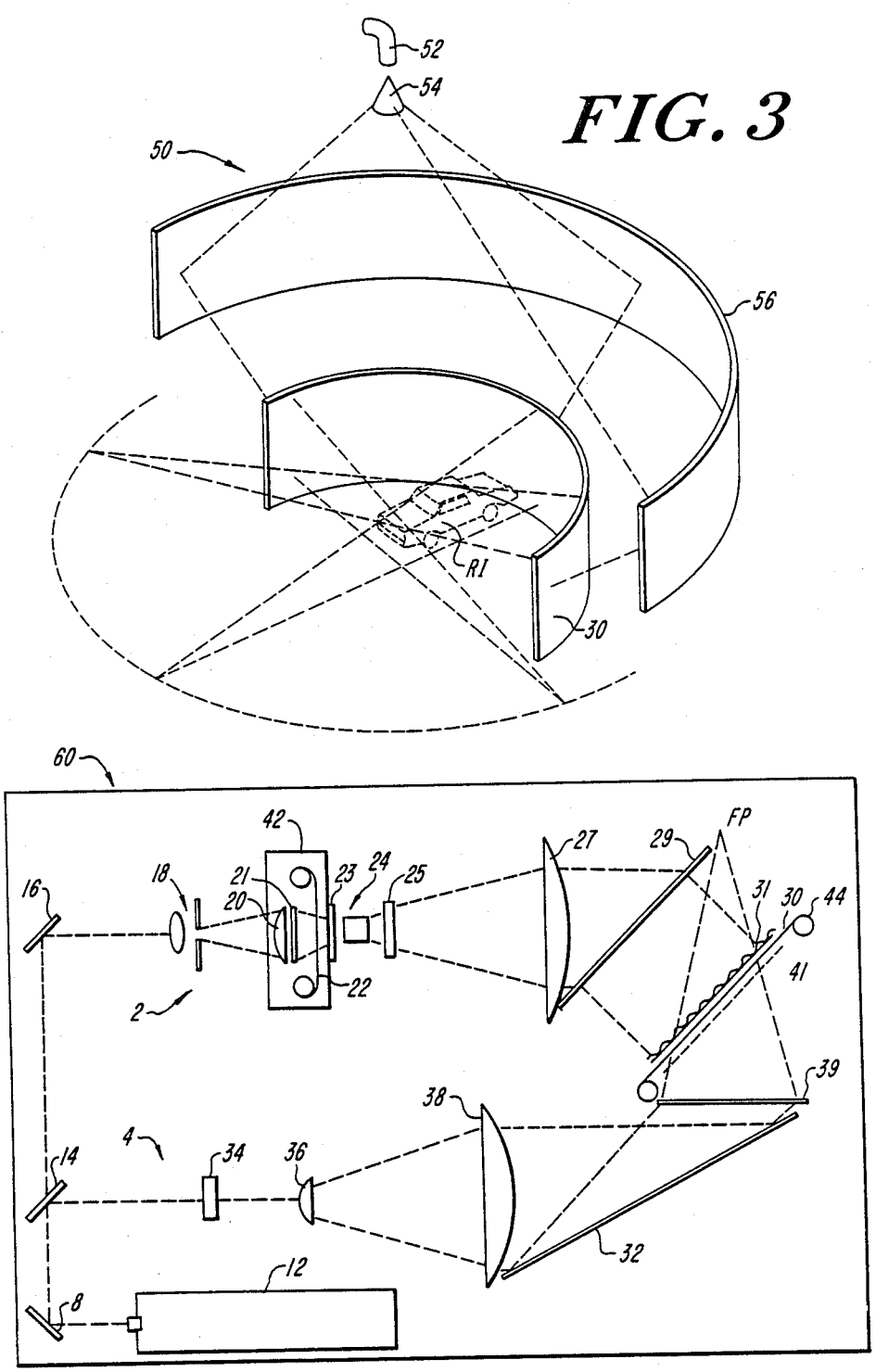
FIG. 3 is a schematic isometric illustration of a transmission-mode alcove hologram display according to invention.
FIG. 4 is a schematic layout in side view of a printer for reflection-mode holograms according to the invention.

After the hologram film is exposed and processed, it can be wrapped around a clear plastic half-cylinder for transmission-mode illumination and viewing as shown in FIG. 3. The alcove hologram display 50 includes a illumination source 52 (e.g. a laser light transmitting optical fiber), a conical mirror 54, cylindrical reflecting mirror 56 and hologram 30. The laser light diverging from the optical fiber 52 is first reflected by conical mirror 54 and then the large cylindrical mirror 56. The horizontally converging illumination beam is then the phase conjugate of the reference beam which was used to expose each sub-hologram of the hologram. The images projected by the composite hologram overlap to provide the three-dimensional real image RI.

Each strip of the hologram 30 is preferably illuminated from 45 degrees above the vertical, which is to say that the light is converging in the horizontal direction to a point centered below the axis of the half-cylinder. It is only necessary that the beam be expanded enough to cover the height of the mirror 56. Conical mirror 54 can be replaced by a spinning plane mirror which sweeps out the length of the half-cylindrical mirror 56.

The result is that the real images of the "image screen" produced by all of the strip holograms are overlapped in the space at the center of the "alcove" hologram, each being viewable from the direction it was projected from, and each presenting a distinct view of the intended scene. As the viewer moves from left to right, further such views come into view, and a solid-looking 3-D view of the subject is offered with convincing solidity and a large amount of "look around."

FIGS. 4–6 illustrate another embodiment of an alcove printer 60 adapted for reflection-mode displays with white light illumination; again, the components which are the same or equivalent to those discussed above in FIGS. 1 and 2 are referenced as like-numbered elements. In FIG. 4, the printer 60 includes laser 12 (e.g., a kyrpton ion laser operating at about 647 nanometers), first mirror 8, beam splitter 14, object optics 62 and reference optics 64.

The object optics of FIG. 4 (illustrated also in FIGS. 5A and 5B) further include mirror 16, spatial filter 18 (e.g., a divergent lens-pinhole filter), condensing lens 20, diffuser 21, projection medium 22, slit aperture 23, projection lenses 24, weak cylindrical lens 25, collimator 27, cylindrical holographic optical element 29, and anisotrophic diffuser 31.

The reference beam optics of FIG. 4 (illustrated also in FIGS. 6A and 6B) further include a weak first cylindrical lens 34, a strong second cylindrical lens 36 (disposed in an orthogonal orientation), collimator 38, mirror 32, a cylindrical holographic optical element 39, and slits 41.

When projection film is used to store object images, printer 60 can also include a pin-registered transport 42. Likewise, printer 60 can include an analogous sliding transport 44 for holding and moving the holographic recording medium 30.

In printer 60, the object beam exposing light must seem to be coming from the intended viewing location; that is, diverging or collimated in the vertical direction, and steeply converging in the horizontal direction. Two images are formed simultaneously by the object beam system 2, as indicated in the vertical and horizontal views of FIGS. 5A and 5B. First, an image of the spatial light modulator or 35 mm film frame is projected toward the holographic cylindrical lens 29, which redirects and converges the light to form a strip on the recording surface 30. The image is astigmatically focused: the waves converge near the recording surface 30 in the plane of the "vertical" figure, and at the cylindrical lens surface in the perpendicular "horizontal" direction. Secondly, in vertical slit aperture 23 within the projection lens system is also imaged (in the "horizontal" plane) at the recording surface to define a slit object beam there, allowing the use of diffuser 31 behind the input image plane to minimize coherent image artifacts and widen the slit object beam.

The cylindrical lens in this case can be, for example, an off-axis holographic lens, made by exposure to a line image formed by a silica rod and a collimated beam. The light to this lens is collimated by a large-diameter spherical lens 27 between it and the projection lens 24. Its 45° off-axis alignment causes a vertical magnification of the image by a factor of 1.41, which is compensated for by the demagnification processing mentioned above.

If the object beam light arrived substantially perpendicularly to the recording surface in the vertical direction, the resulting hologram would be visible only in the same "straight ahead" direction. In order to provide an extended vertical viewing zone, the object beam light is spread or diffused in the vertical direction, and the vertical direction only, by an anisotropic diffuser 31 placed just before the recording surface. It is at this directionally selective diffuser surface that the vertical focus of the image is actually placed. This element can be any highly anisotropic diffuser, for example, a cylindrically lenticulated sheet.

The illumination for the alcove hologram is vertically inclined at 45 degrees at the hologram's mid-height, and gradually varies in angle up and down, but is everywhere perpendicular to the curved surface in the horizontal direction. Thus, the reference beam can be converging in the vertical direction, and shaped into a collimated sheet beam of only a few millimeters thickness (in order to minimize wasted laser light) in the horizontal direction. The unfolded optical system (without mirrors) is shown in FIGS. 6A and 6B in vertical and horizontal views (for practical reasons, the entire printer can be laid on its side in the actual setup). The sheet beam is produced with a set of cross cylindrical lenses 34 and 36, with their common foci at the back focal distance from the spherical collimator 38. The resulting collimated sheet beam is then converged in the vertical direction to focus, after passing through the film, at the intended location of the illumination source. An off-axis holographic spherical lens approximate this function, although any well-corrected 280 mm dia, 540 mm f1 (f/1.9) lens would suffice. Slit jaws 41 just after the holographic lens serve to better define the edges of the slit hologram exposure, and to allow a more uniform intensity within it.

Conventional silver-halide holographic film can be employed in printer 60 (Agfa-Gevaert 8E75 on non-birefringement acetate base, 300×400 mm; 3 pieces are joined to form an alcove hologram). The film can be attached (by capillary forces) and index matched to a glass platen by a thin layer of xylene. In an illustrative printing procedure, the platen was translated one millimeter between exposure by a lead-screw driven slider on each side. The timing and synchronization of the various shutters and film advances can be performed entirely under microcomputer control.

After exposure, the film is developed and bleached to produce reconstruction at the same wavelength as the exposure, unless a deliberate color shift is introduced by variation of the emulsion thickness before exposure or during viewing.

Figure 7:
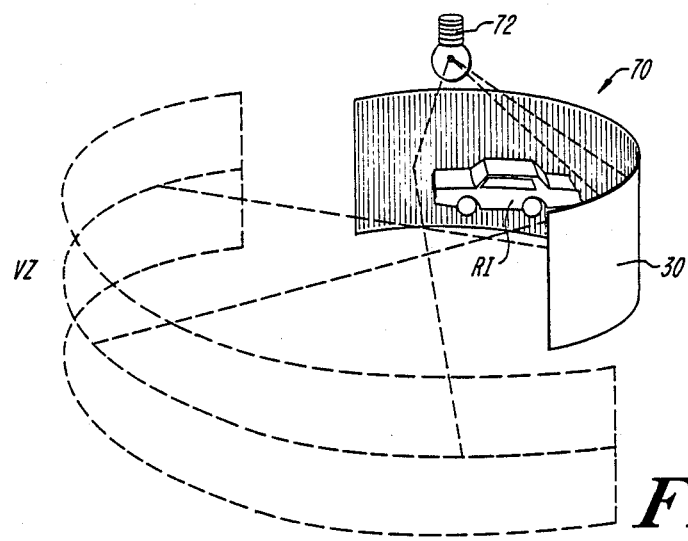
FIG. 7 is a schematic isometric illustration of a reflection-mode alcove hologram display according to the invention.

Printer 60 has been implemented and used to construct area-multiplexed holograms, comprising 900 slit holograms that are 300 mm high and 1 mm wide, carefully abutted to fill a film surface that forms the interior of a concave half cylinder 600 mm across. The hologram is designed to be illuminated by a point source centered above the hologram, at an angle of forty-five degrees to the center of the hologram, as shown in FIG. 7. Each of the component strip holograms has a horizontal viewing angle of about fifty-three degrees, so that a projected image about 275 mm across can be seen over an angle of roughly one hundred degrees before cut off of the edges is visible. Each hologram provides a vertical viewing zone of about thirty degrees or about 161 mm high at the intended viewing distance of 600 mm from the alcove center. If several color components are recorded with variations of emulsion thickness between exposure and the input images are suitably remapped to anticipate the effect of wavelength shift, the component can be made to register accurately to produce fully mixed colors in the resulting image.

After processing, and optionally after being painted black on its rear surface, the hologram is stretched on a semi-cylindrical plexiglas surface, and viewed as shown schematically in FIG. 7. In display 70, a point source of light 72, such a xenon arc, is placed above the center of the alcove so as to illuminate the center of the hologram 30 at 45 degrees. Holographically diffracted light is then reflected toward the viewing zone, through which several viewers can move to enjoy a three-dimensional, computer-graphic image that appears to be cradled within the space of the alcove, and that offers an extremely wide angle of view.

Figure 8:
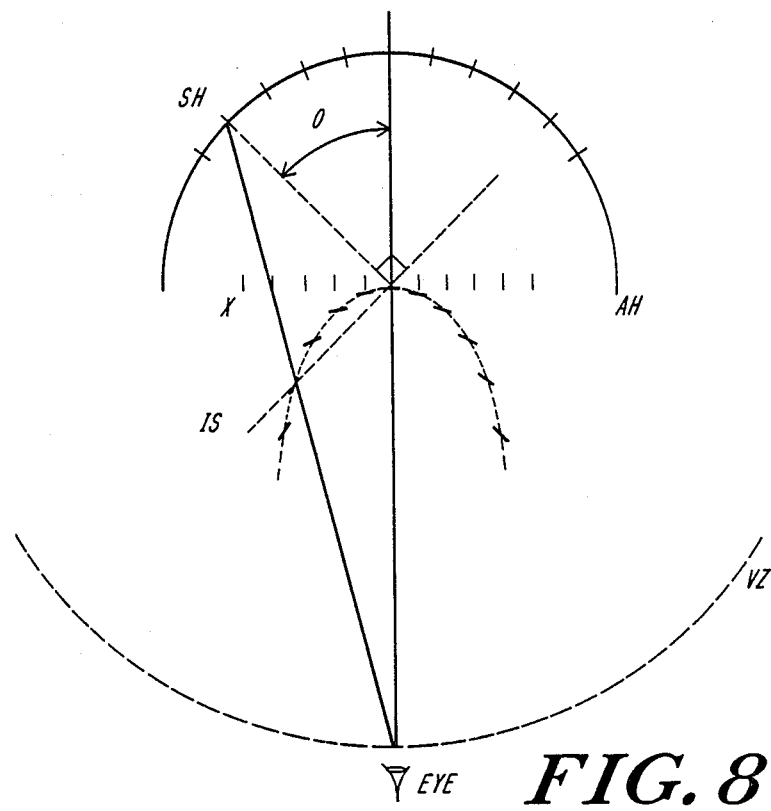
FIG. 8 is top view illustration of the composite image geometry of the sub-holograms and image field of the displays according to the invention.

In FIG. 8 is schematic illustration of the composite image geometry observed with the alcove hologram displays of the present invention. A viewer's eye, which can be anywhere in the viewing zone VZ is regarding an element of the image which appears to have the horizontal coordinate $X_n$ across the mouth of the "alcove" hologram. In fact, the eye is seeing the image projected by the sub-hologram $SH_n$, which is at a specific angle $\Phi_n$ from the center of the viewing axis. That sub-hologram presents a real image of the image screen that exposed it $IS_n$ which is tipped at the same angle $\Phi_n$ to the viewer. The composite image seen by the viewer is thus made up of vertical strips at many distances, which together describe a deeply concave surface. The images projected onto each vertical strip area of the corresponding image screens must therefore be processed to have the correct foreshortened size and location.

Figure 9:
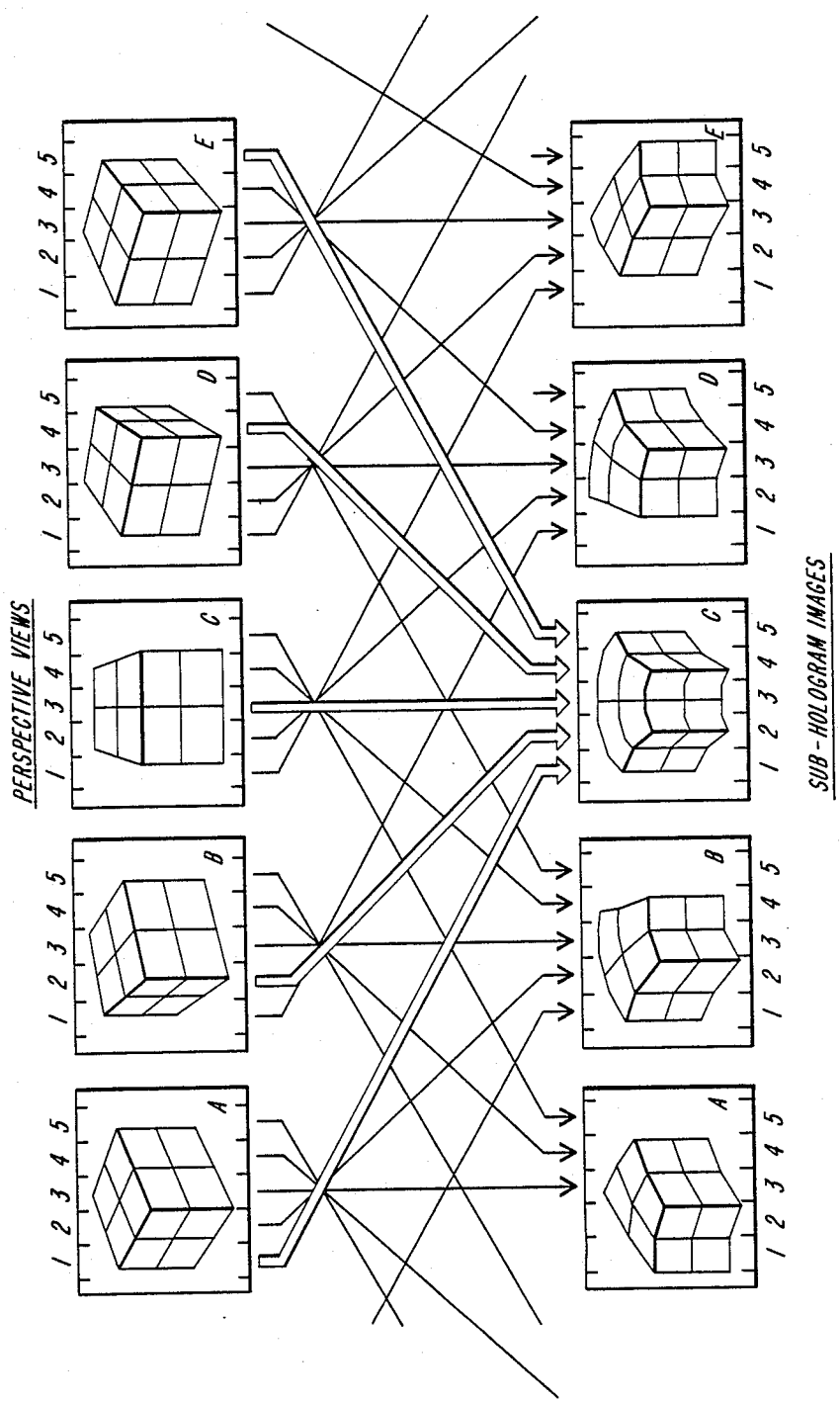
FIG. 9 is a schematic illustration of an image processing technique according to the present invention in which a view is predistorted for alcove display.

FIG. 9 provides a simplified illustration of an image processing technique for obtaining the sub-holograms of the present invention. For illustration purposes a series of five sub-holograms each composed of five vertical strips (A1 ... A5 through E1 ... E5) are shown. In reality, there can be as many as 1000 or more vertical strip holograms in the display. The sub-holograms are prepared from perspective views, which are decomposed into vertical columns (A1 ... A5 through E1 ... E5). The columns of any one perspective view must be distributed as shown among many image screens in order to be properly recombined in the composite image. Consequently, the projection onto any one image screen must be built up from columns from many different perspective views.

The simplified illustration of FIG. 9 shows how the rotated views of a cube in the center of an alcove hologram are merged to form an image on any one frame of the 35 mm "cine" film. The result is view of the scene that seems bowed towards the observer, with a predistortion that grows with distance from the observer.

Figure 10:
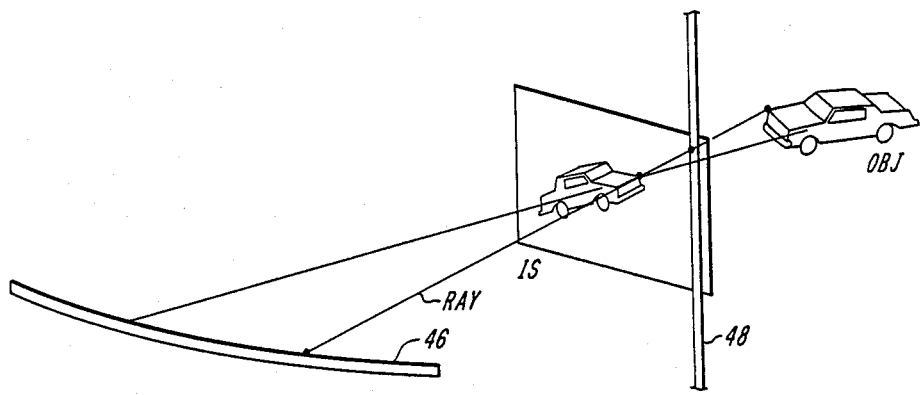
FIG. 10 is a schematic illustration of another image processing technique according to the present invention in which anamorphic ray tracing is employed to obtain a predistorted view of an object.

FIG. 10 is a schematic illustration of an alternative method for obtaining predistorted views for holographic recording in which anamorphic ray-tracing is employed. A pinhole view corresponding to normal perspective can be generalized by considering the pinhole as the product of two crossed slits. By separating the slits in distance such that a horizontal slit 46 is curved at the location of the viewing zone and the vertical slit 48 is situated at the location of the vertical strip of the desired sub-hologram, a reversed and anamorphically distorted image of an object can be obtained in the same way as described above in connection with FIG. 5. The ray-tracing technique, however, is particularly well suited for computer-aided design projects where the dimensions and shape (in terms of luminance values) of the object are already defined in the computer memory.

In FIG. 10, the object is shown behind the hologram for clarity; it can be at any distance. Each point on the object emits only one ray that passes through both slits 46, 48. The intersection of that ray with the image screen IS defines the image of that point which should be projected during the holographic exposure. By repeating this ray-tracing process for all visible points of the object, a reversed and anamorphically distorted view appropriate for the particular viewing location is obtained for holographic recording.

I claim:

1. A holographic printer for recording a holographic stereogram, the printer comprising:
    a holographic recording medium;
    a laser source of coherent light;
    a beamsplitter for splitting said laser light into an object beam and a reference beam;
    object beam projection means for projecting a series of views of an object with said object beam, said views being predistorted for alcove viewing;
    an image screen adapted to receive and diffuse said projected views from said object beam projection means to expose said recording medium with a predistorted image of said object;
    reference beam converging means for projecting said reference beam onto said recording medium to create an overlapping exposure with said object image, the reference beam converging means further including means for converging said reference beam at a distance equivalent to an intended illumination distance for said stereogram; and
    an aperture-defining means for sequentially exposing thin vertical slits of said holographic recording medium with images from said image screen to produce a series of views corresponding to expected viewpoints of an audience, the image screen and aperture-defining means cooperating to diffuse and define sub-hologram views on said holographic recording medium to form a stereogram of narrow vertical images, such that upon illumination of said stereogram in an alcove display format, a viewer moving through a viewing zone sees a progression of views as though moving around said object.

2. The printer of claim 1 wherein the object beam projection means further includes a photographic recording medium having a series of predistorted views of said object which provide anamorphic correction of said image upon illumination of said stereogram.

3. The printer of claim 1 wherein the object beam projection means further includes an electrooptical image modulator capable of generating a series of predistorted views of said object which provide anamorphic correction of said image upon illumination of said stereogram.

4. The printer of claim 1 wherein the image screen further includes a ground glass plate which diffuses said predistorted object views prior to incidence on said recording medium to provide an expanded vertical view zone upon illumination.

5. The printer of claim 1 wherein the image screen further includes a cylindrical lens and an anisotropic diffuser which cooperate to diffuse said predistorted object views prior to incidence on said recording medium to provide an expanded vertical viewing zone upon illumination.

6. The printer of claim 1 wherein the reference beam converging means further includes optical beam shaping means for shaping said reference beam into a vertically elongated beam corresponding in shape to vertical slit formed by said aperture defining means.

7. The printer of claim 1 wherein the reference beam converging means further includes first and second cylindrical lenses for anamorphically diverging said reference beam, a collimating lens, and a converging lens for projecting the reference beam onto said holographic recording medium.

8. The printer of claim 1 wherein the reference beam converging means projects said reference beam onto the same side of said recording medium as the object beam in order to generate a transmission-mode hologram.

9. The printer of claim 1 wherein the reference beam converging means projects said reference beam onto the opposite side of said recording medium as the object beam in order to generate a reflection-mode hologram.

10. The printer of claim 1 wherein the reference beam converging means further includes means for converging the reference beam in one direction and means for collimating said beam in an orthogonal direction.

11. A method for recording a holographic stereogram of an object, the method comprising:
    constructing a series of predistorted views of an object from successively displaced positions on adjacent strips of a light modulating medium so as to produce a series of anamorphically predistorted views suitable for alcove viewing;
    exposing a holographic medium by projecting said series of predistorted object views through an image screen onto said medium, the image screen serving to receive and diffuse said projected views;

projecting a reference beam onto said holographic medium in conjunction with said projected, diffused object views from said image screen to create a series of holographic recordings; and limiting the exposures to vertical strips on said holographic medium to produce a stereogram of individual sub-holograms each providing a view corresponding to an expected viewpoint of a audience, such that upon illumination of said stereogram in an alcove display, a viewer moving through a viewing zone sees a progression of views as though moving around said object.

12. The method of claim 11 wherein the step of constructing a series of predistorted object views further including pre-recording said views on a photographic recording medium and then generating said views from the photographic medium by projection.

13. The method of claim 11 wherein the step of constructing a series of predistorted object views further includes generating said views with an electrooptical image modulator.

14. The method of claim 11 wherein the step of constructing a series of predistorted object views of an object further includes decomposing a series of undistorted perspective views into columns and then redistributing said columns to provide anamorphic predistortion.

15. The method of claim 11 wherein the step of constructing a series of predistorted object views of an object further includes processing a series of undistorted views with a cylindrical lens to provide anamorphic predistortion.

16. The method of claim 11 wherein the step of constructing a series of predistorted object views of an object further includes computing predistorted image values from image data stored in a computer memory by ray-tracing techniques.

17. The method of claim 11 wherein the step of exposing a holographic medium by projecting said object views further includes projecting said object views through an image screen which diffuses the object views prior to incidence on the medium to provide an expanded vertical viewing zone upon illumination.

* * * * *